Figure 1:
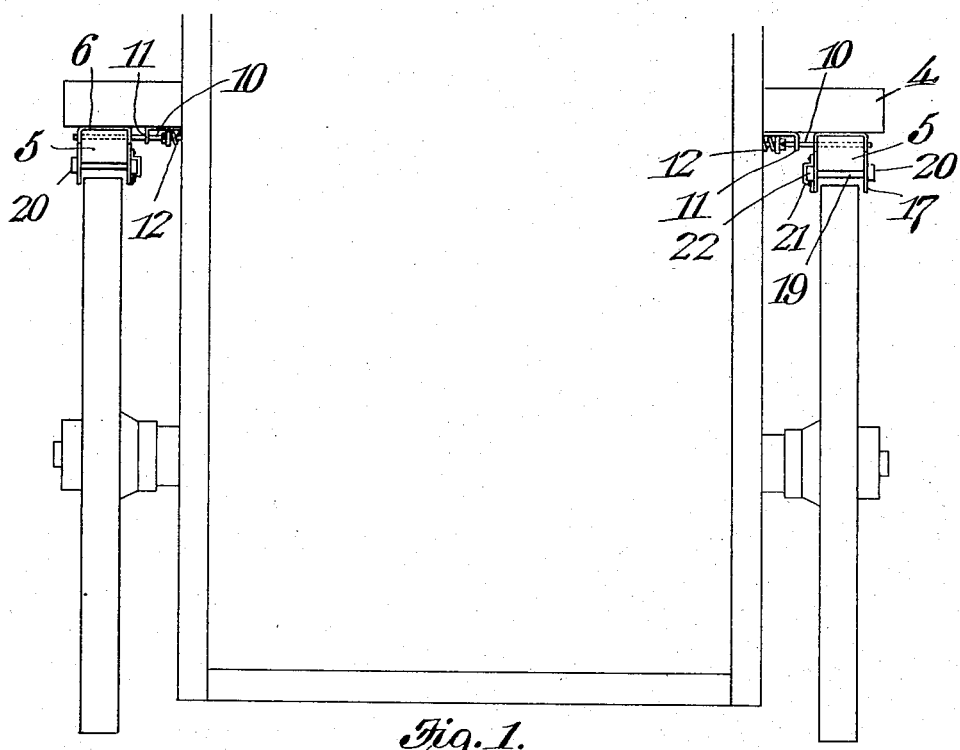

A. THRASHER & J. B. OZBIRN.
BRAKE SHOE AND WEAR PLATE.
APPLICATION FILED FEB. 3, 1916.

1,219,195.

Patented Mar. 13, 1917.

Witnesses

Inventors
Alvin Thrasher
and John B. Ozbirn.
By Perry N. Pattison
Attorney

UNITED STATES PATENT OFFICE.

ALVIN THRASHER AND JOHN B. OZBIRN, OF IONA, OKLAHOMA.

BRAKE-SHOE AND WEAR-PLATE.

1,219,195.    Specification of Letters Patent.    Patented Mar. 13, 1917.

Application filed February 3, 1916. Serial No. 75,974.

*To all whom it may concern:*

Be it known that we, ALVIN THRASHER and JOHN B. OZBIRN, citizens of the United States, residing at Iona, in the county of Murray and State of Oklahoma, have invented certain new and useful Improvements in Brake-Shoes and Wear-Plates, of which the following is a specification.

This invention relates generally to wagons, and particularly to the braking mechanism thereof.

The invention has for its primary object to provide a brake shoe which may be conveniently and easily attached to or detached from the brake beam of a vehicle, to facilitate repairing the same.

A still further object of the invention is to provide a device of the character set forth, wherein the brake shoe or block may be held securely to the brake beam.

A further object of the invention is to provide a brake block or shoe having improved means for supporting a wear plate thereto, whereby the plate may be removed when worn and supplemented by a new plate.

With these objects in view together with others which will appear as the description proceeds, the invention resides in the novel combination and arrangement of parts all as will be described more fully hereinafter, illustrated in the drawings, and particularly pointed out in the claims.

The invention will be best understood by reference to the accompanying drawings, wherein—

Figure 2:
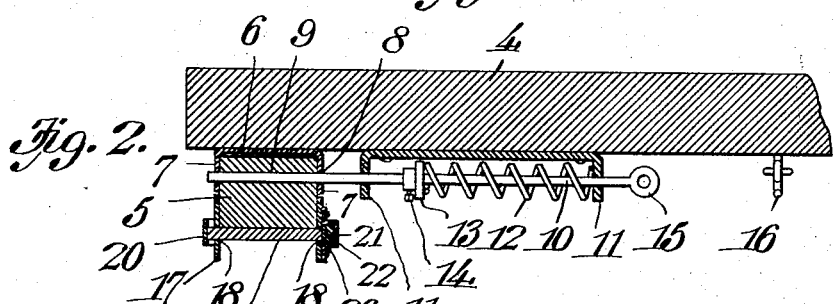
Figure 3:
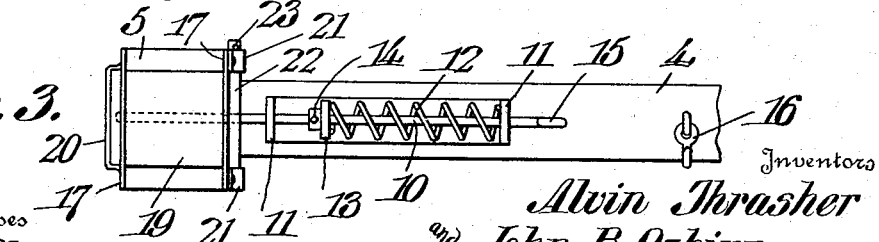

Figure 1 is a plan view of the rear end of a conventional form of wagon, illustrating a brake beam equipped with mechanism constructed and arranged in accordance with the invention, Fig. 2 is an enlarged horizontal section through the brake beam and illustrating the detail construction of the improved brake block or shoe and its coördinate parts, and Fig. 3 is a rear elevation of the device shown in Fig. 2.

The invention comprehends broadly the arrangement of a brake block or shoe upon the sliding beam of a vehicle in such manner as to enable the same to be readily detached therefrom, and to this end the beam, illustrated conventionally at 4, may be provided upon its rear face with a pair of spaced elements between which the brake shoe or block 5 may be secured in position to engage the periphery of the vehicle wheel when the brakes are applied. As a convenient means for mounting the block 5 in correct position, a yoke 6 is secured to the beam in any suitable manner, the said yoke providing the spaced vertically disposed arms 7, each of which is provided with an opening 8, the same being in transverse alinement. The block 5 is of such dimension laterally as to fit snugly within the yoke 6, and is provided with a transversely disposed opening for registration with the openings 8 in the spaced members or arms 7. Arranged upon the rear face of the beam 4, and preferably to extend longitudinally thereof is a slidable member in the form of a bolt or pin 10, of a diameter sufficient to enable the same to enter at its free end the registered openings 8 and 9 of the arm 7 and block 5. This rod or slidable member may be mounted for suitable support in the spaced brackets 11 arranged upon the said beam, and a coil spring 12 encircles the said rod to exert outward pressure through the adjustable collar 13 to hold the said rod normally in projected position. The coil spring 12 may be seated at its opposite end against the inner bracket 11. The collar may be adjusted and held in its various positions longitudinally of the slidable member 10 by means of a set screw 14. The opposite or inner end of the slidable rod 10 may be provided with an eye 15, through which a hook or link 16 secured upon the beam may be inserted when it is desired to hold the said rod 10 withdrawn to permit of the removal of the block or shoe 5.

Secured to the block 5 and extending slightly beyond the opposite vertical edges thereof are plates 17. Each of the plates is provided with a narrow vertically disposed slot 18, the said slots being in transverse alinement for the reception of a removable wear plate 19. The said slots are also so positioned as to enable the inner face of the wear plate to engage against the outer or adjacent face of the shoe 5, thereby relieving the plates 17 of the strain incident to the friction caused when the brake is applied to the wheel. The plate 17 adjacent the outer end of the beam may be cut and bent outwardly to provide a stop 20 co-extensive with the slot 18 to limit the movement of the wear plate 19 in one direction. Arranged adjacent the upper and lower edges of the inner plate 17 are clips 21, within which a locking bar 22 may be inserted to inclose the slot 18 in the said plate after the wear plate 19 has been inserted; a pin 23 is preferably arranged upon the bar 22 to limit the downward movement of the latter.

When it is desired to remove the brake shoe or block, the sliding bar 10 may be withdrawn against the tension of the spring 12, and held in retracted position by means of the hook 16 upon the beam 4. The brake shoe may then be readily removed from its position between the members 7. For removing the wear plate 19, the bar 22 may be withdrawn from its position within the clips 21 and the plate 19 may then be slid from engagement within the slots 18. Thus it is seen that new wear plates may be introduced into the slots upon the plates 17 when it is desired to replace the same. The operation of adjusting the brake shoe or block to the beam is obvious.

Inasmuch as the brake shoes upon the opposite ends of the beam 4 are identical in construction and means of adjusting the same, only one has been described, but it is to be understood that the single description will suffice for both.

We claim.

1. In a vehicle brake, a beam, a block on said beam, a plate extending outwardly from each of the lateral sides of said block, each of said plates being provided with a slot each alined with the other, a stop on the outer side of one of said plates covering one of said slots, a wear plate adapted to be inserted through said slots to cover said shoe and to abut said stop at one end, and means for securing the opposite end of said plate in the opposite slot, substantially as described.

2. In a vehicle brake, a block, a plate extending outwardly from each of the lateral sides of said block, each of said plates being provided with a slot lying flush with the outer face of said block, a stop spaced outwardly from one of said plates to cover its slot, a pair of clips secured to the opposite plate in spaced relation, a wear plate arranged upon said block with its ends in said slots, a bar for insertion through said clips to engage the adjacent end of said wear plate, and a pin on said bar to limit the movement of said bar inwardly of said clips, substantially as described.

3. In a vehicle brake, a beam, a pair of spaced members on said beam, said members being provided with alined openings, a block adapted to be inserted between said members and provided with an opening adapted to register with the openings in said members, spaced brackets on said beam, a rod mounted for sliding movement in said brackets to be projected to engage within said registered openings, a collar on said rod, a spring interposed between said collar and one of said brackets for holding said rod normally projected, and means for holding said rod retracted, substantially as described.

In testimony whereof we affix our signatures in the presence of two witnesses.

ALVIN THRASHER
JOHN B. OZBIRN.

Witnesses:
T. F. GAFFORD,
JAS. T. BRINK.

Copies of this patent may be obtained for five cents each, by addressing the "Commissioner of Patents Washington, D. C."